(12) United States Patent
Halpern et al.

(10) Patent No.: US 10,129,215 B2
(45) Date of Patent: Nov. 13, 2018

(54) INFORMATION SECURITY THREAT IDENTIFICATION, ANALYSIS, AND MANAGEMENT

(71) Applicant: INTERNET CRIMES GROUP, INC., Plainsboro, NJ (US)

(72) Inventors: Joshua I. Halpern, Philadelphia, PA (US); Kevin E. Leininger, Philadelphia, PA (US); Randall Dey Toth, Moraga, CA (US); Osbourne A. Shaw, South Orange, NJ (US)

(73) Assignee: Internet Crimes Group Inc., Plainsboro, NJ (US)

( * ) Notice: Subject to any disclaimer, the term of this patent is extended or adjusted under 35 U.S.C. 154(b) by 457 days.

(21) Appl. No.: 14/926,596

(22) Filed: Oct. 29, 2015

(65) Prior Publication Data

US 2016/0050181 A1 Feb. 18, 2016

Related U.S. Application Data

(62) Division of application No. 10/754,806, filed on Jan. 9, 2004.

(51) Int. Cl.
| | |
|---|---|
| *H04L 29/06* | (2006.01) |
| *G06Q 10/10* | (2012.01) |
| *G06Q 50/18* | (2012.01) |
| *G06F 17/27* | (2006.01) |
| *H04L 29/08* | (2006.01) |

(52) U.S. Cl.
CPC ........ *H04L 63/0254* (2013.01); *G06F 17/272* (2013.01); *G06Q 10/10* (2013.01); *G06Q 50/18* (2013.01); *G06Q 50/188* (2013.01); *H04L 63/1441* (2013.01); *H04L 63/308* (2013.01); *H04L 67/02* (2013.01)

(58) Field of Classification Search
CPC ..... H04L 51/12; H04L 63/20; H04L 63/1441; H04L 63/1416; H04L 63/0254; G06F 17/272; G06Q 10/10
See application file for complete search history.

(56) References Cited

U.S. PATENT DOCUMENTS

| | | | |
|---|---|---|---|
| 6,941,466 B2* | 9/2005 | Mastrianni | G06Q 10/107 726/22 |
| 7,085,745 B2* | 8/2006 | Klug | G06Q 10/107 705/401 |
| 7,647,376 B1* | 1/2010 | Jagger | H04L 51/12 709/206 |
| 8,463,821 B2* | 6/2013 | Lubbers | G06F 17/30896 707/793 |
| 2004/0215977 A1* | 10/2004 | Goodman | G06Q 10/107 726/22 |

* cited by examiner

*Primary Examiner* — Chirag R Patel
(74) *Attorney, Agent, or Firm* — Moritt Hock & Hamroff LLP; Bret P. Shapiro

(57) ABSTRACT

A method and systems for information security threat identification, management, and analysis, including identifying and managing threats posed by senders of unsolicited e-mail, pirates, hackers, and virus-spreaders. Methods are provided for identifying and facilitating legal action against a sender of unsolicited e-mail. A secure evidence repository can be used for storing copies of and information regarding unsolicited e-mails in a forensically sound manner. A relational knowledge database can be used for storing copies of and information regarding unsolicited e-mails such that the information can be queried, manipulated, or analyzed.

20 Claims, 14 Drawing Sheets

Fig. 4    400

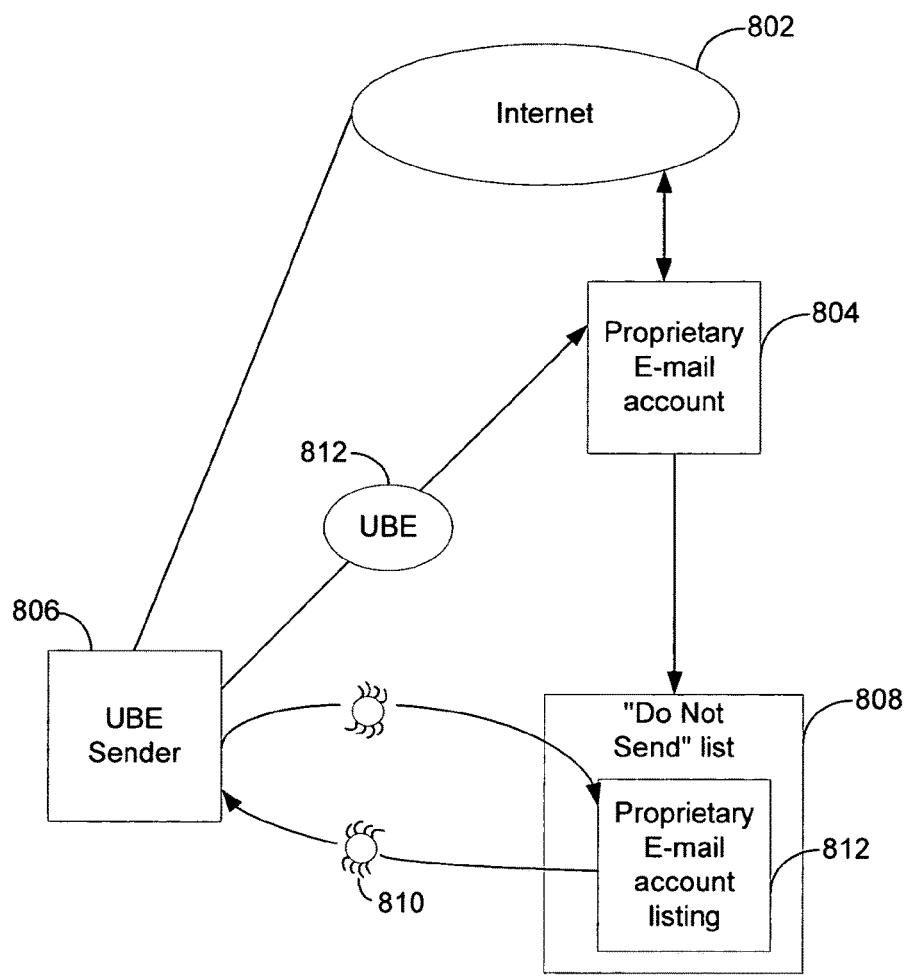

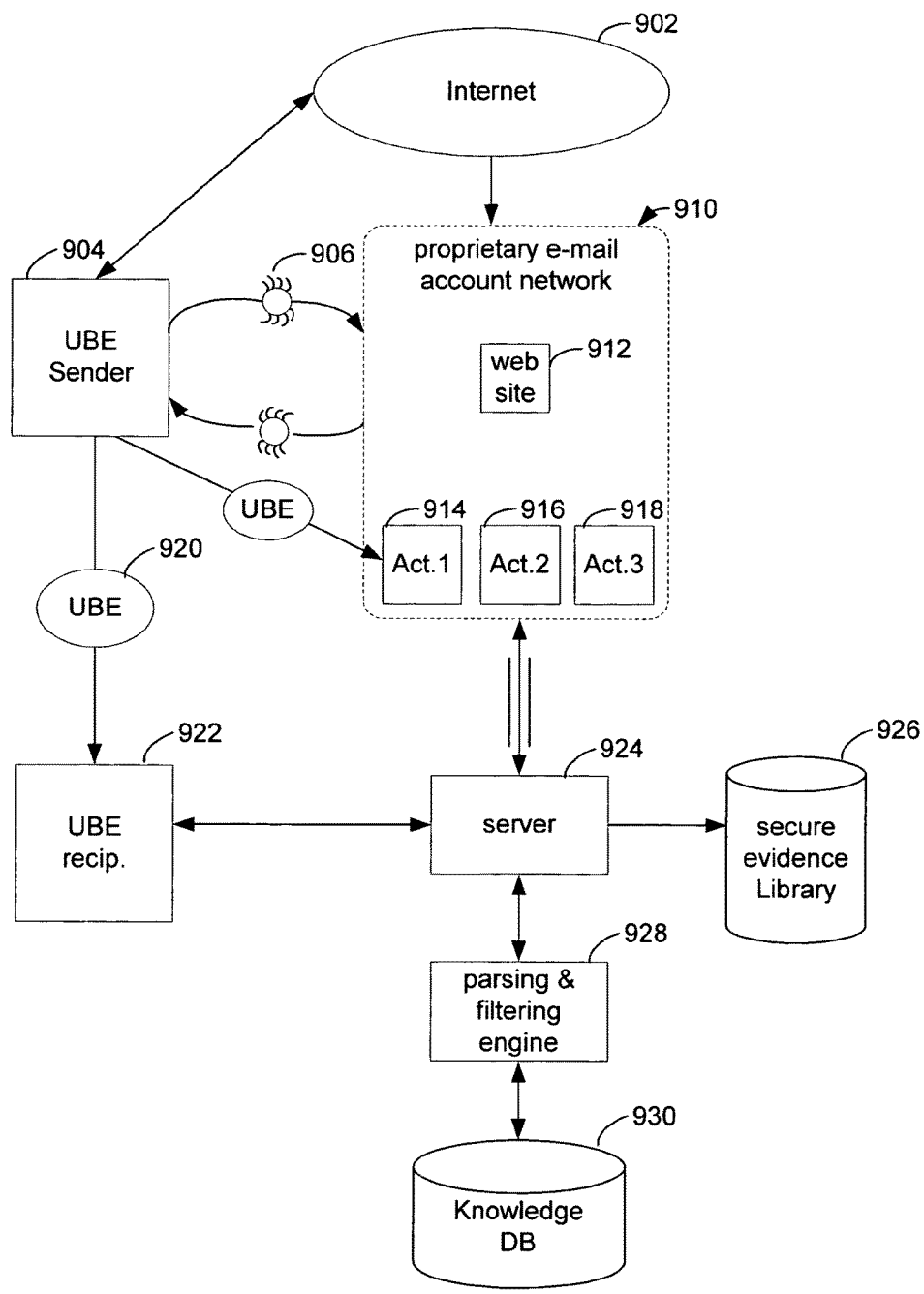

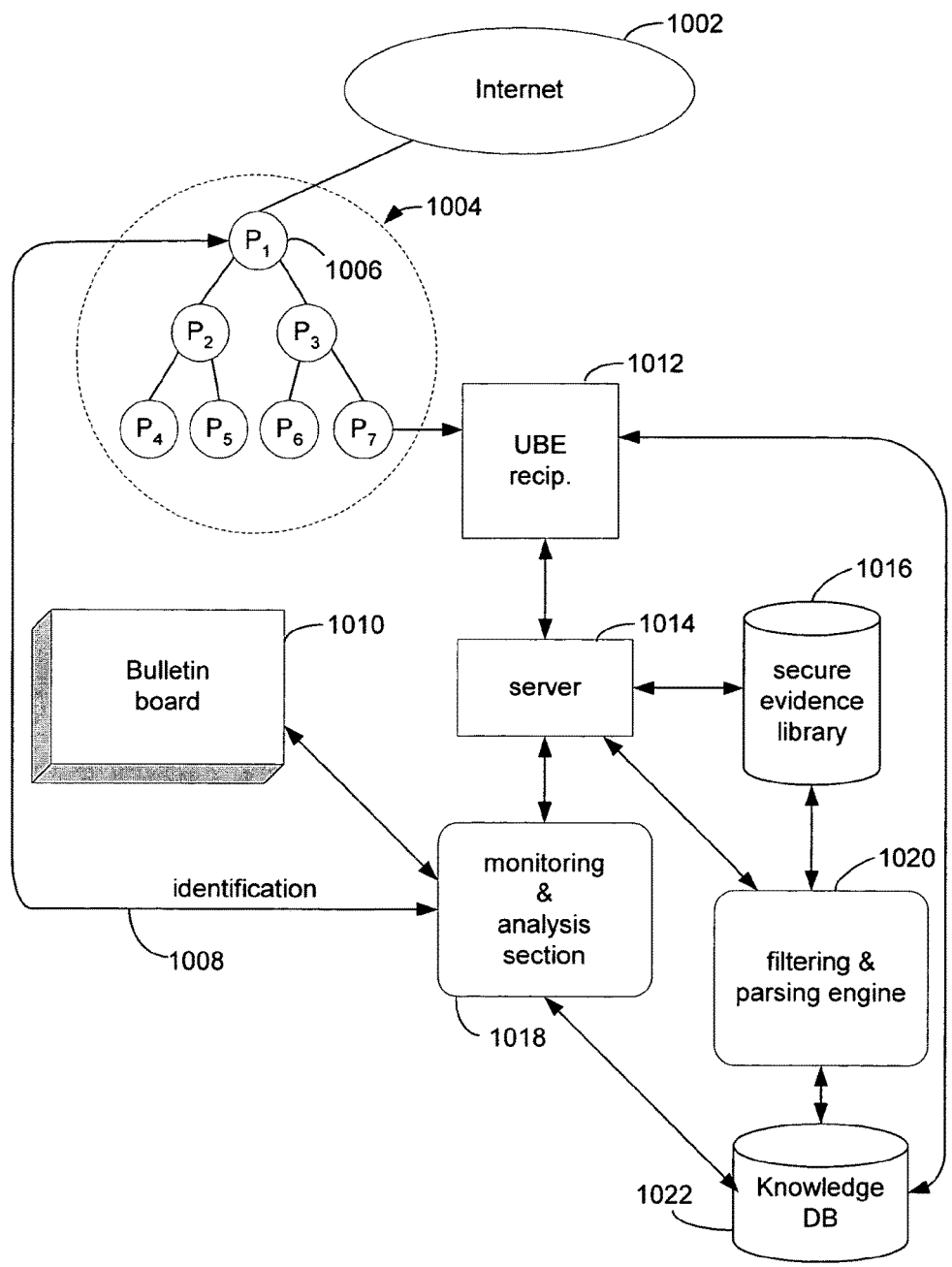

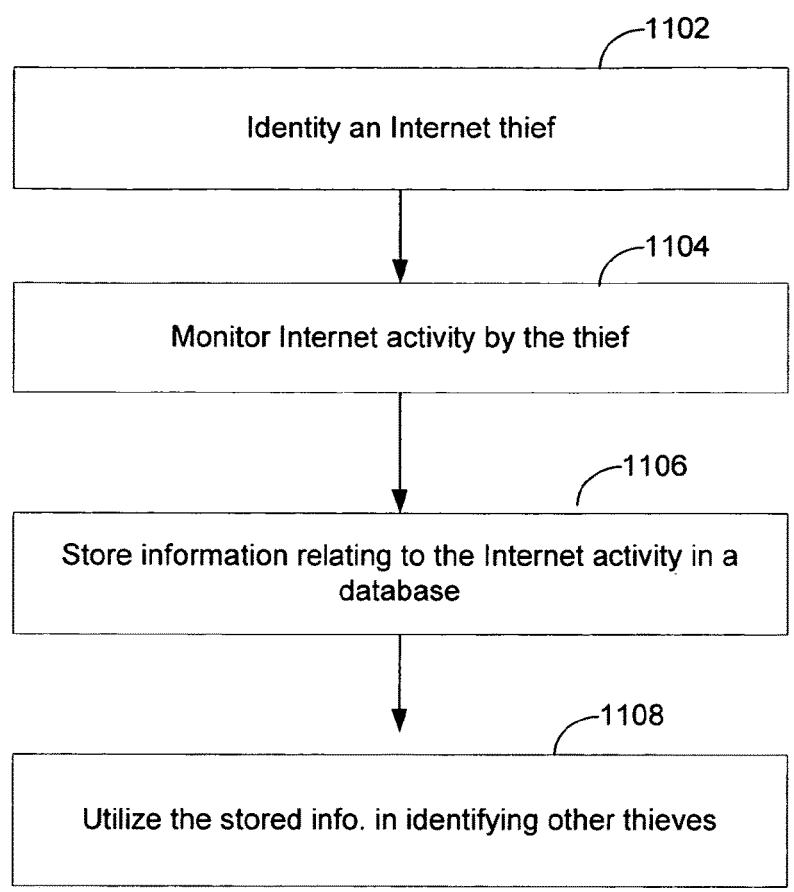
Fig.11    1100

INFORMATION SECURITY THREAT IDENTIFICATION, ANALYSIS, AND MANAGEMENT

CROSS REFERENCE TO RELATED APPLICATION

This Application is a Divisional under 35 U.S.C. § 121 of U.S. application Ser. No. 10/754,806 filed on Jan. 9, 2004, the disclosure of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

This invention relates in general to information security, and in particular to systems and methods for internet threat identification, analysis, management, and prevention along with a system and method to monetize the same.

The importance of information security threat identification, analysis, management, and prevention has grown dramatically in recent years and continues to expand. For example, with the increasing use of the Internet and electronic communication, such as e-mail, for business, personal, and entertainment purposes, efficient, safe, accurate, and reliable electronic communication is essential. Without such communications, tremendous economic and other damage can result, and the utility of electronic communication is compromised. Effectively identifying, analyzing, and managing threats to information security is therefore critical.

Spam, piracy, hacking, and virus spreading, for example, represent important and growing threats. Unsolicited bulk e-mails, or "UBEs", can cause serious loss in many ways. In the business context, one type of UBE, unsolicited email (UCE or "spam") is distracting, annoying, wastes workers' time, and reduces productivity. It can clog or slow down networks, and spread computer viruses and pornography, leading to further complications and losses. Excessive UBEs may lead to workers disregarding actual solicited e-mail.

UBEs, in addition to their sharp negative effect in a business context, can also have dramatic negative consequences in a social context. Sources of UBEs often prey on children and other susceptible groups, scamming them or threatening their safety and privacy. For example, spam from phony or disreputable drug companies may induce individuals to purchase vital drugs, under false pretenses or claims about the nature, source, or other critical information about the drug that they are purchasing, at great peril to the purchasers and great profit to the scamming company. Other problems caused by UBEs include identity theft, fraudulent advertising, digital piracy, counterfeit products, diverted products, malicious code (virus/trojan) distribution, and digital entertainment piracy.

Systems are known for attempting to deal with information security, spam, piracy, hacking, and virus spreading. For example, some systems simply attempt to determine whether a received e-mail is unsolicited and then filter or block such an UCE. Such systems suffer from a variety of deficiencies. Blocking or filtering spam can be ineffective, since spammers can often easily find ways to avoid or get around the filter, or find another or different way in to a network or computer. Since spam can be sent cheaply in mass quantity, and since spam blocking does nothing to hold the source of the spamming accountable, the source is free to continue spamming. Companies or entities that suffer loss or damage as a result of spam are often without practical recourse, as the spammers often obscure or hide their real identity.

As an example of the above some spam includes an HREF to an URL that causes an image to be displayed. With such spam, even though the image appears to the eye to contain text that may be searched for by a filter, the filter misses the spam because the image contains no electronically formatted text to detect. Additionally, such spam may use a chain of URLs to lead to the image, and the URL causing the image to be displayed can be disabled shortly after the spam is sent, which can make tracking of the source difficult.

Related problems exist in the computer piracy content. For example, identity thieves may use spamming or spoofing, such as e-mails falsely purporting to be from a particular source, like a bank, for example, to collect personal or financial information from deceived recipients. Even if most of the spoofing is blocked or ignored, the thief may gain from what responses are obtained, without losing appreciably from unsuccessful attempts.

Some systems are available which provide limited internal, civil, or governmental enforcement actions against perceived sources of threats. However, these system have many drawbacks. There is no process in the art for gathering large volumes of reliable, court admissible evidence regarding infringing email activity. There is no mechanism for efficiently associating evidence with a refined list of threat sources. Prior art systems are manually intensive especially with regard to evidence/intelligence aggregation, association and presentation. There is also no method for qualifying and quantifying threats posed by a particular activity source.

UBEs are presently costing large companies tens of millions of dollars each year. A single source may be responsible for great damage from spamming, even though the identity of the source may not obvious, and much apparently unrelated spamming all may originate from an individual source.

Thus, there is a need for a method and system which can provide information security threat identification, management, and analysis more effectively than the prior art.

SUMMARY OF THE INVENTION

The present invention provides methods and systems for information security threat identification, management, and analysis, including identifying and managing threats posed, for example, by senders of unsolicited e-mail, identity thieves, digital pirates, product counterfeiters, product diverters, hackers, and virus-spreaders. Methods are provided for identifying and facilitating legal action against a sender of unsolicited e-mail. A secure evidence repository can be used for storing copies of and information regarding unsolicited e-mails in a forensically sound manner. A relational knowledge database can be used for storing copies of and information regarding unsolicited e-mails such that the information can be queried, manipulated, or analyzed.

In some embodiments, information is stored regarding unsolicited e-mails containing HREFs. Such HREFs may include a URL chain associated with the e-mail as well as an image obtained by accessing the URL. The image is stored in a forensically sound manner.

In some embodiments, proprietary email accounts are used that obtain only unsolicited e-mails. Unsolicited e-mails obtained by the proprietary email accounts are stored and analyzed to obtain information about spammers or identity thieves and their activities.

In some embodiments, after a spammer or thief (including hackers, virus-spreader, thieves, and others) is identified, Internet-based activities or communications by the spammer or thief are monitored or analyzed, such as by monitoring a Web-based bulletin board used by the spammer or thief By monitoring or analyzing the spammer's or thief's activities or communications, information can be obtained by which other spammers or thieves can be identified. From this information, attractive targets for legal actions can be identified.

In some embodiments, methods are employed that enable forensically sound extraction of information from computer hardware components, such as hard drives that are be seized from an alleged spammer or thief as a result of a legal action. Such methods can include extraction of information without the need to boot up the device, helping to preserve data integrity.

In one embodiment, the invention provides a method for facilitating a legal action relating to unsolicited electronic communication. The method includes determining that a first entity is receiving unsolicited electronic communication. The method further includes obtaining first information associating a second entity with a source of at least a portion of the unsolicited electronic communication. The method further includes obtaining second information sufficient to allow initiation of a legal action against the second entity relating to the unsolicited electronic communication.

In another embodiment, the invention provides a method of identifying senders of unsolicited e-mail. The method includes identifying an entity responsible for sending unsolicited e-mail. The method further includes monitoring Internet activity by the entity. The method further includes storing information relating to the Internet activity in a database. The method further includes utilizing the stored information to identify other entities who are senders of unsolicited e-mail.

In another embodiment, the invention provides a method for facilitating bringing of a civil cause of action relating to sending of unsolicited e-mails. The method includes determining that a first entity is receiving unsolicited e-mails. The method further includes determining an impact of the unsolicited e-mails on the first entity. The method further includes obtaining information evidencing that the second entity is at least partially responsible for sending at least a portion of the unsolicited e-mails. The method further includes obtaining information sufficient to allow a legal action against the second entity relating to the unsolicited e-mails.

In another embodiment, the invention provides a system for facilitating a legal action relating to unsolicited electronic communication. The system includes a network, a server computer connected to the network, a first computer connected to the network, the first computer being associated with a first entity; and one or more databases connected with the server computer and the first computer. Unsolicited electronic communication received by the first computer is sent to and stored in the one or more databases. The server computer is effective in obtaining information associating a second entity with a source of at least a portion of the unsolicited electronic communication, and obtaining information sufficient to allow initiation of a legal action against the second entity relating to the unsolicited electronic communication.

In another embodiment, the invention provides a method for facilitating bringing a legal action against a second entity in relation to sending of unsolicited e-mails to a first entity. The method includes utilizing one or more proprietary email accounts to receive unsolicited e-mails. The method further includes sending unsolicited e-mails received by the one or more proprietary email accounts to one or more databases for storage. The method further includes analyzing information stored in the one or more databases and relating to the unsolicited e-mails to obtain information useful in facilitating bringing a legal action against one or more entities in relation with sending of the unsolicited e-mails to the first entity.

In another embodiment, the invention provides a method for facilitating bringing of a civil cause of action relating to sending of unsolicited e-mails. The method includes determining that a first entity is receiving unsolicited e-mails. The method further includes obtaining first information evidencing that the second entity is at least partially responsible for sending at least a portion of the unsolicited e-mails. The method further includes obtaining second information sufficient to allow a legal action against the second entity relating to the unsolicited electronic communication. A first e-mail of the unsolicited e-mails comprises a reference to one or more URLs. Opening the first e-mail causes a non-electronically formatted image to appear. Third information about the first e-mail message is stored in a secure database, the third information comprising a copy of the first e-mail, each of the one or more URLs, and a copy of the image.

In another embodiment, the invention provides a method for facilitating obtaining information regarding unsolicited e-mails. The method includes one or more computers associated with a first entity sending copies of received unsolicited e-mails through a secure channel for storage in a secure database. The method further includes storing copies of the unsolicited e-mails in a knowledge database, the knowledge database being a relational database. The method further includes allowing querying of the relational database to obtain information regarding the unsolicited e-mails.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIG. 8 is a conceptual block diagram of a system according to an embodiment of the invention;

FIG. 9 is a conceptual block diagram of a system according to an embodiment of the invention;

FIG. 10 is a block diagram of a system according to an embodiment of the invention; and FIG. 11 is a flow chart of a method according to an embodiment of the invention.

DETAILED DESCRIPTION OF THE PREFERRED EMBODIMENT

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
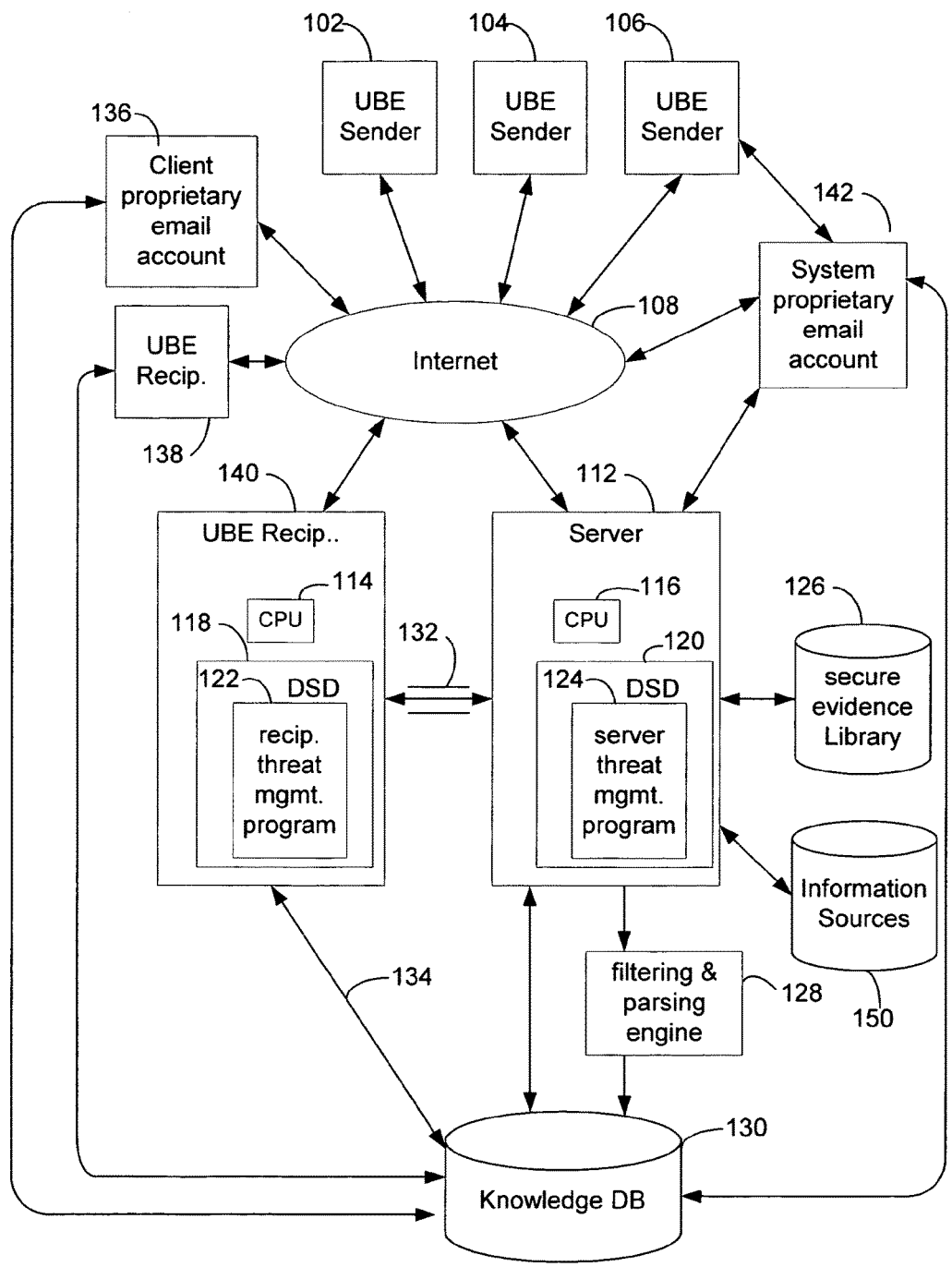
FIG. 1 is a block diagram of distributed computer system, according to an embodiment of the invention.

FIG. 1 is a block diagram of distributed computer system, according to an embodiment of the invention. In computer system 100 depicted in FIG. 1, multiple UBE sender computers 102, 104, 106, multiple UBE recipient computers 138, 140, one or more server computers 112, a system proprietary email account 142 run by the operator of system 100, and a client proprietary email account 136 run by a client of the operator of system 100, are connected to a network such as the Internet 108. Server computer 112 serves as a mail aggregator as discussed below. One or more secure evidence libraries 126 are connected to the server computer 112. One or more knowledge databases 130 are connected to the UBE recipient computers 136, 138, 140 and to the server computer 112. While, in the embodiment depicted, databases 130, 126 are separate from server computer 112, databases 130, 126, or one or some of them, may be located, for example, within server computer 112. Filtering and parsing engine 128 can be connected to the server computer 112. Filtering and parsing engine 128 can be part of server computer 112, can be a separate computer or computers, or otherwise.

While the Internet 108 is depicted, the network connecting the computers can broadly include any of, or an array of, networks or distributed computer systems, which can include wired or wireless networks, public networks, private networks, secure or unsecured networks, cellular telephone networks, one or more local area networks, one or more wide area networks, peer-to-peer networks or systems, and embodiments of the invention are contemplated in which no connection to the Internet is included.

Each of computers 102, 104, 106, 108 136, 138, 140 include one or more Central Processing Units (CPUs) 114, 116 and one or more data storage devices 118, 120 which can include one or more network or Internet Browser programs.

Data storage device 118 of server computer 112 includes server threat management program 124, and UBE recipient computers 136, 138, 140 include recipient threat management programs 122.

Data storage devices of all depicted computers may comprise various amounts of RAM for storing computer programs and other data. In addition, all depicted computers may include other components typically found in computers, including one or more output devices such as monitors, other fixed or removable data storage devices such as hard disks, floppy disk drives and CD-ROM drives, and one or more input devices, such as keyboards, mouse pointing devices, or other pointing or selecting devices. Generally, all depicted computers operate under and execute computer programs under the control of an operating system, such as Windows, Macintosh, UNIX, etc.

Generally, the computer programs of the present invention are tangibly embodied in a computer-readable medium, e.g., one or more data storage devices attached to a computer. Under the control of an operating system, computer programs may be loaded from data storage devices into computer RAM for subsequent execution by the CPU. The computer programs comprise instructions which, when read and executed by the computer, cause the computer to perform the steps necessary to execute elements of the present invention. It is to be understood that, all depicted computers can be computerized devices, such as portable or wireless computerized devices.

Double-headed arrow 132 depicts a secure channel or method for communication between each of UBE recipient computers 136, 138, 140 and server computer 112. This channel, which can utilize the Internet or otherwise, is secured in any of various ways known in the art, helping to preserve the integrity and evidentiary value of information sent through the channel. Furthermore, information stored in secure evidence repository 126 is stored in a secure manner, as discussed below. Information may be zipped prior to sending.

In operation, a UBE sender 112 sends a UBE through the network 108 to UBE recipient 140. Unsolicited e-mails received by recipient computers are securely sent to server computer 112. Additionally, UBEs can be received by system proprietary email account 142 or client proprietary email account 136, which are e-mail accounts designed to receive only unsolicited e-mails (proprietary email accounts and their use are further described below), and then the UBEs can be sent to server computer 112. Client and system proprietary email accounts 142, 136 may also use a secure channel to send information to server 112. In the case of the client proprietary email account 136, messages may be aggregated by a threat management agent (not shown) operating on the client's server.

Server threat management program 140 can then securely send time-stamped copies of a UBE through channel 132 to the secure evidence repository 126 for forensically sound storage. Copies of UBEs can be sent by server computer 112 through the filtering and parsing engine 128, and then to knowledge database 130, which can be a relational, queriable database. Information in secure evidence repository 126 can be saved for use in bringing or supporting a legal or other action against unsolicited e-mail senders or other responsible parties. For example, raw, forensically sound copies of UBEs can be stored in secure evidence repository 126 for later use in a legal action. Detailed examples of operation of the system 100 and its components are provided below.

One or more data mining programs, such as, or one or more artificial intelligence programs, or both, are used in analysis according to methods of the invention. These uses can include, for example, analyzing information, including information stored in the knowledge database 130, to identify threats, to identify senders of unsolicited electronic communication, to estimate or calculate impacts of unsolicited electronic communication, and to perform monitoring or link analysis (as described below).

Information in knowledge database 130 can be used, for example, by server threat management program 124, or by human analysis, or both, to determine information about entities responsible for sending unsolicited e-mails, and other information relating to the unsolicited e-mails. The information in knowledge database 130 can be combined with information in information sources database 150 as discussed in more detail below. The information in information sources database 150 includes open and closed sources. Open sources include a WHOIS database, Internet IRC channels, UseNet Groups, web sites, bulletin boards, and other accounts designed by system 100. Closed sources include other information acquired by the operator of system 100 (for example databases acquired from known UBE senders), and input and email accounts from clients of the operator of system 100.

Recipients can query knowledge database 130 to obtain information about or relating to unsolicited e-mails. For example, supposing that Bank A becomes aware that UBEs are being sent falsely claiming to be from Bank A and requesting that recipients provide personal or financial information that has been lost or needs updating (an example of phishing). Bank A may query knowledge database 130 to search for such UBEs that may be contained therein, such as by querying knowledge database 130 for all UBEs for all e-mails containing the term "Bank A" in the title of the e-mail, for instance.

Furthermore, reports may be requested to be generated to summarize and provide analysis utilizing information obtained from the knowledge database 130. For example, numerous employees of a recipient company may be receiving copies of a particular UBE. A report may be generated by using information about UBEs of that type, and by analysis thereof, which can include determining the source or sources of the such UBEs.

Bank A may arrange for a report to be made which may include analysis of such UBEs, which can include human and computerized analysis, to determine and provide information about the source or sources of the UBEs, and to provide evidence for later legal action against the source or sources.

In using the server threat management program 124, information from knowledge database 130 can be analyzed and used to identify or bring action against parties responsible for other types of information security-related threats, including thieves, hackers, virus-spreaders, etc. Furthermore, as described in detail with reference to FIG. 10, information from knowledge database 130 can be used to track down and identify associates of such responsible parties.

Figure 2:
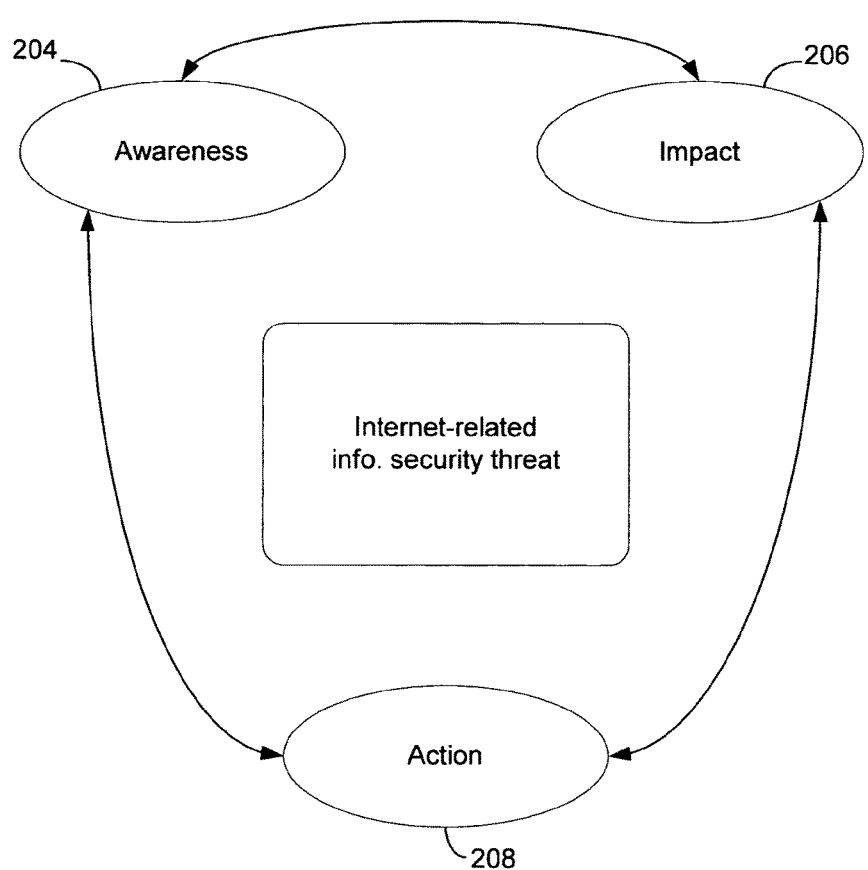
FIG. 2 is a conceptual block diagram of a method, according to an embodiment of the invention.

FIG. 2 is a conceptual block diagram of a method 200, according to an embodiment of the invention. The method 200 conceptually represents steps leading from awareness of an Internet-based information security threat to taking action against the threat, including mitigation of the threat, recovery of losses, and other actions.

Some embodiments of the invention are used with respect to unsolicited e-mail-related threats, as well as other types of information security threats or potential threats, whether related to unsolicited e-mail or not, including piracy, fraud, virus-spreading, pornography, hacking, and others.

Step 204 represents awareness of a threat, such as a threat posed to a company by received unsolicited e-mails. This step can also represent awareness of detailed information about the threat, including its source or sender, as can be obtained using methods according to the invention and described throughout.

Step 206 represents knowledge relating to the impact of the threat. For example, this step can include the company obtaining information, whether statistical or otherwise, indicating or quantifying the impact, including damage, loss, or cost, suffered by the company as a result of the threat. The impact can be calculated or estimated with regard to present, past, or anticipated future losses, such as over a past or anticipated future time frame.

Once the company, for example, is aware of the threat and its impact, at step 208, action is taken against the threat. This action can include, for example, bringing a legal action, such as a local, state, federal criminal or civil action or suit against one or more entities determined and evidenced to be responsible for the impact, or that portion of the impact for which the one or more entities can be shown to bear responsibility. For example, an entity, which can include a company, individual person, or other entity, may bear legal responsibility for the impact caused by unsolicited e-mails sent by the entity. Such legal action can result in recovery of money through settlement or judgment, injunction relief, and other types of recovery, restitution, or remuneration.

Figure 3:
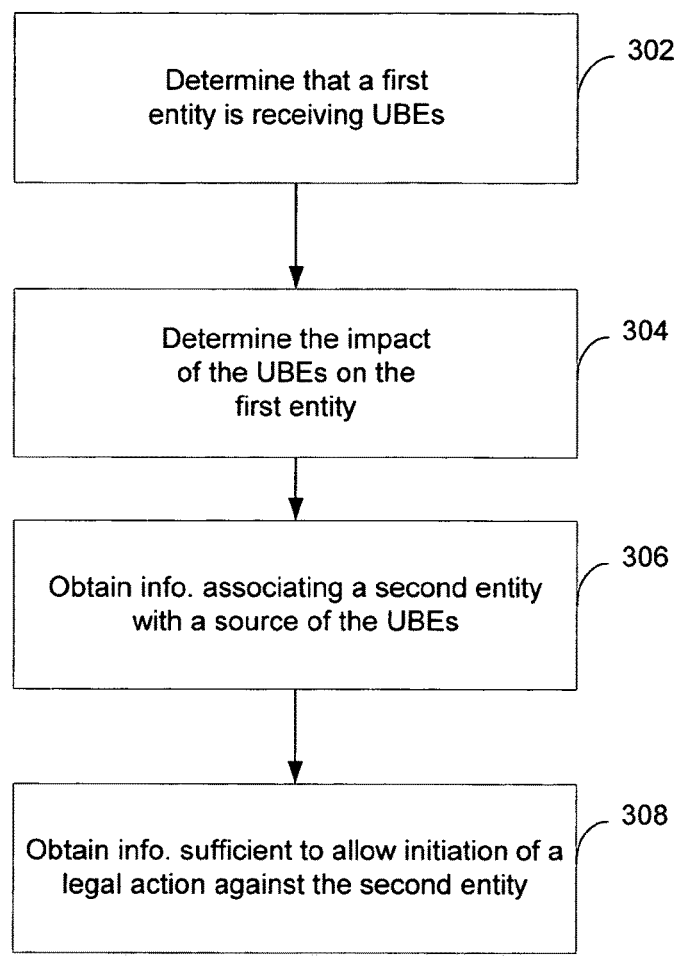
FIG. 3 is a flow chart of a method of facilitating a legal action, according to an embodiment of the invention.

FIG. 3 is a flow diagram of a method 300 of facilitating a legal action, according to one embodiment of the invention. In some embodiments, the steps of the method 300 are accomplished including use of a server or recipient threat management program (depicted in FIG. 1).

At step 302, the method 300 determines that a first entity, such as company A, is receiving unsolicited e-mails.

At step 304, an impact of the unsolicited e-mails on company A is determined, which determination can include being estimated, calculated, predicted, judged, etc., whether by computers, by hand, or both.

At step 306, information is obtained associating a second entity, such as company B, with a source of the unsolicited e-mails. This can include company B being the sender or source of the unsolicited e-mails. This information can be obtained, for example, using information saved in a knowledge database (depicted in FIG. 1).

At step 308, sufficient information is obtained to allow initiation of a legal action (including equitable actions) against company B, which can include information stored in the secure evidence repository 126 (FIG. 1). In some embodiments, information is stored in the secure evidence repository in a manner so as to be sufficient to produce evidence to meet legal standards such as proof beyond a reasonable doubt, clear and convincing evidence, or preponderance of the evidence. Furthermore, step 308 can include determining requirements for a particular legal action and seeking to ensure that sufficient information is obtained to bring action or obtain a remedy based on such requirements.

Figure 4:
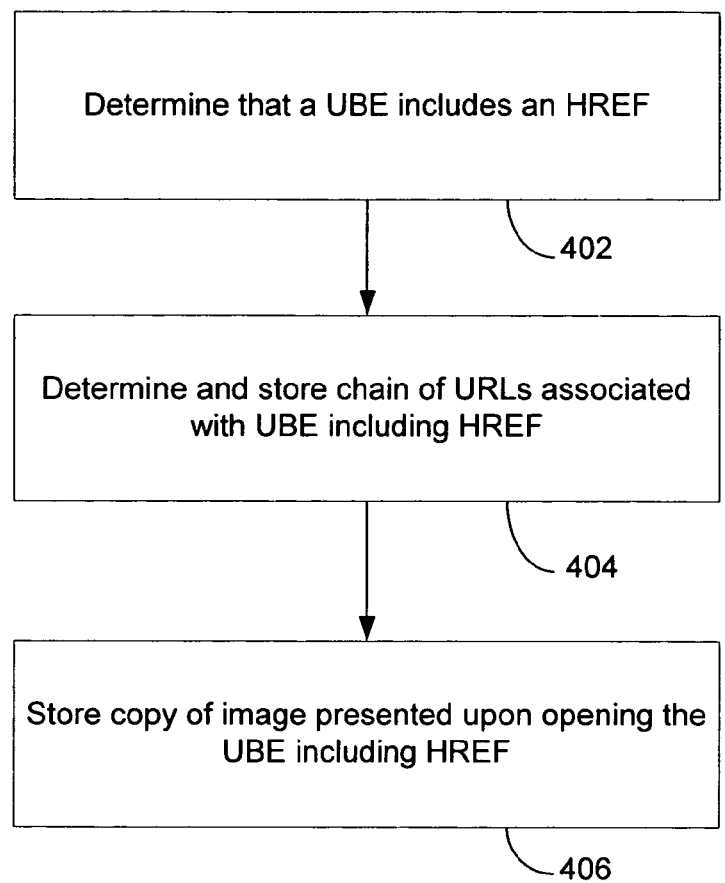
FIG. 4 is a flow chart of a method according to an embodiment of the invention.

Referring to FIG. 4, some UBEs can contain an HTML file reference or HREF that causes a user's mail browser to download various files from Internet servers references by the HREFs. Such file types include .GIF; .JPEG; .BMP; .PNG; .TIF; .TIFF; .WMV; .AVI; .WAV; .MPG; .MPEG; and .MP3. The image may appear to be a text e-mail, but is actually an image (an example of a non-electronically formatted text file). Existing techniques to identify or block a UBE may look for electronically formatted text, and so apparent text included in the image may be overlooked. Furthermore, the unsolicited e-mail may contain a reference to a URL that refers to another URL, and so on, before the URL presenting the image is accessed, further complicating detection. Still further, the URL presenting the image can be disabled or modified in a short period of time, such as a few days after opening of the e-mail, which can foil later attempts at identifying the sender or the displayed message.

Method 400 can be used in conjunction with other methods described herein, such as methods for facilitating bringing legal actions against senders of unsolicited e-mails, or can be used independently thereof. The method can be performed using the server threat management program 124 and system 100 (FIG. 1) or otherwise.

At step 402, it is determined that a particular unsolicited e-mail includes an HREF.

At step 404, a chain of URLs (one or more) pointed to or accessed as a result of opening the e-mail is determined, and associated information is stored, for example, in the secure evidence repository 136 and the knowledge database 130.

At step 406, a copy of an image presented to the opener of the e-mail, such as a .GIF image, is time-stamped and stored in secure evidence repository 126. Additionally, system 100 (FIG. 1) may be used to access the URL and store portions of the web site associated with the URL including, for example, the first page of the web site. This first page is also stored in a secure evidence repository. System 100 may also gather information from information sources database 150 relating to the web site including the owner of the web site from a WHOIS database, or other IP related information. Again, all information gathered is performed in a forensically sound manner. The system responsible for serving each file is determined and documented.

The above steps provide a complete and secure record of the unsolicited e-mail and its affect at the time of opening. This information can be used in identifying the sender, or as evidence in an action against the sender, for example.

Figure 5:
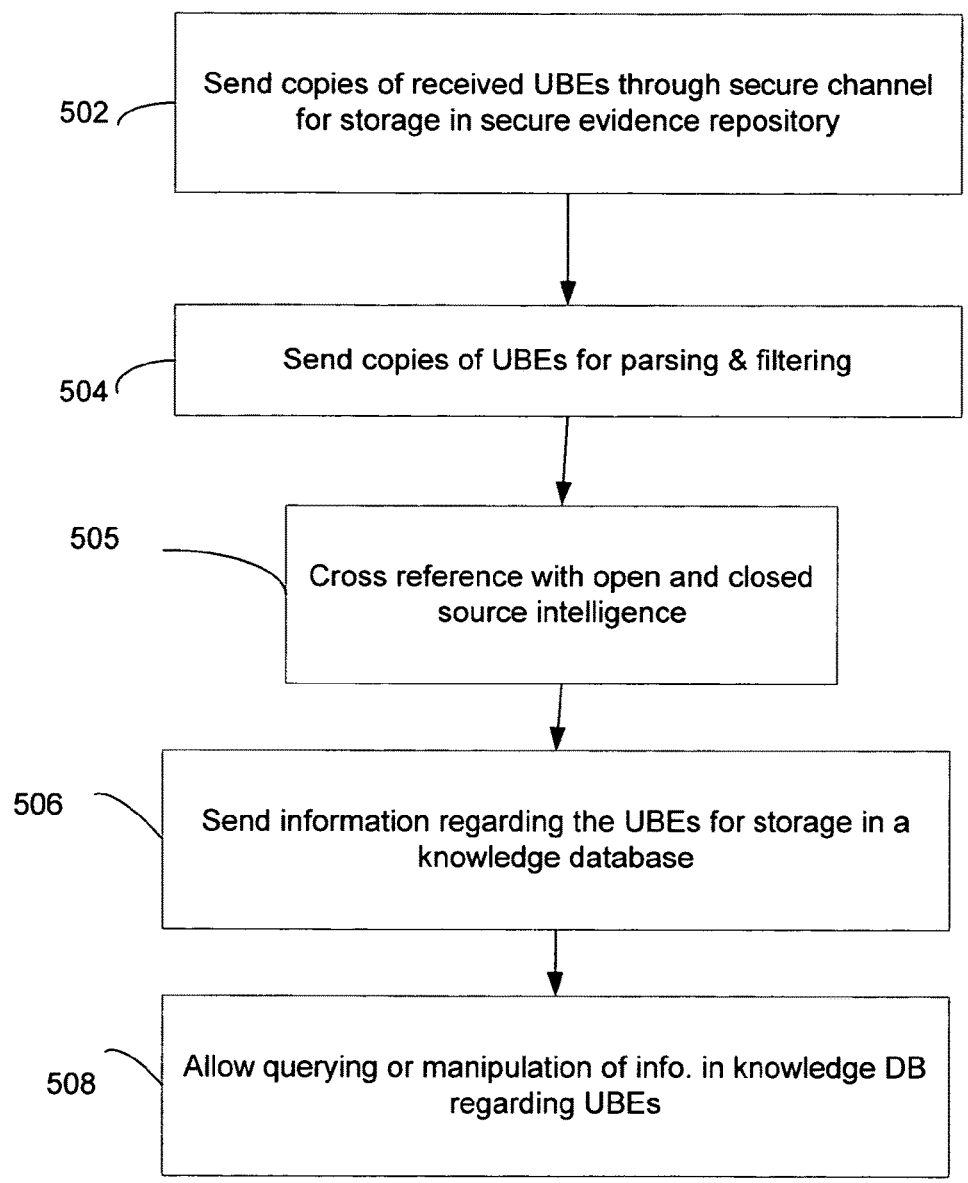
FIG. 5 is a flow chart of a method according to an embodiment of the invention.

FIG. 5 is a flow diagram of a method 500 including storing copies of, or information regarding, unsolicited e-mails, according to one embodiment of the invention. Method 500 may be accomplished using elements of the system 100 described with reference to FIG. 1.

At step 502, a UBE recipient 140, such as Company A, sends copies of received unsolicited e-mails through secure channel 132 for storage in a secure evidence repository 126, such as including sending the e-mails to server computer 112. The server computer 112 then causes copies of the e-mails to be stored in a secure evidence repository 126.

At step 504, copies of the unsolicited e-mails are sent for parsing and filtering, such as by parsing and filtering engine 128. This can include assigning a unique identifier to each e-mail, parsing each e-mail to identify each field thereof (title, body, domains, dates, text, etc.), parsing to find particular characteristics or information, filtering to remove unneeded information or portions of the unsolicited e-mails, etc. At step 505, the parsed information is cross-referenced with open and closed source intelligence.

At step 506, information regarding the unsolicited e-mails, such as information obtained after parsing and filtering, is stored in knowledge database 130, which may be a relational database. The knowledge database 130 can contain information regarding unsolicited e-mails from many recipients, and the information can include added information such as a unique identifier for each e-mail, information organized into tables, etc.

At step 508, querying or manipulation is allowed of information in the knowledge database 130. Copies may be made for manipulation, to preserve the integrity of the knowledge database information. This step can include, for example, manipulation of the information in order to help identify a sender. This step can also include queries made by recipients to obtain organized or customized information or reports about unsolicited e-mails.

Figure 6:
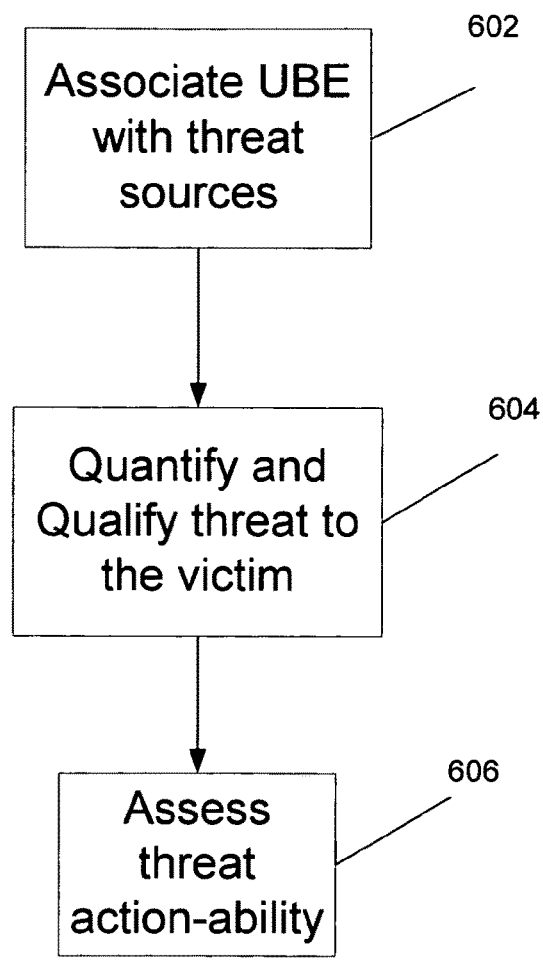
FIGS. 6, 6A, 6B and 6C are flows chart illustrating methods in accordance with an embodiment of the invention.

FIG. 6 is a flow chart of a method 600 of facilitating a legal action, according to an embodiment of the invention. Method 600, for example, may be accomplished using the server computer 112, the recipient computer 140, the threat management programs 122, 124, the databases 126, 130 (as depicted with reference to FIG. 1), and the parsing engine 128.

At step 602, method 600 associates UBEs with sources of threats.

At step 604, method 600 quantifies or qualifies the threat to the victim related to each threat source, beneficiary, or intermediary.

At step 606, method 600 assesses the action-ability of the threat source, beneficiary, or intermediary.

Figure 6A:
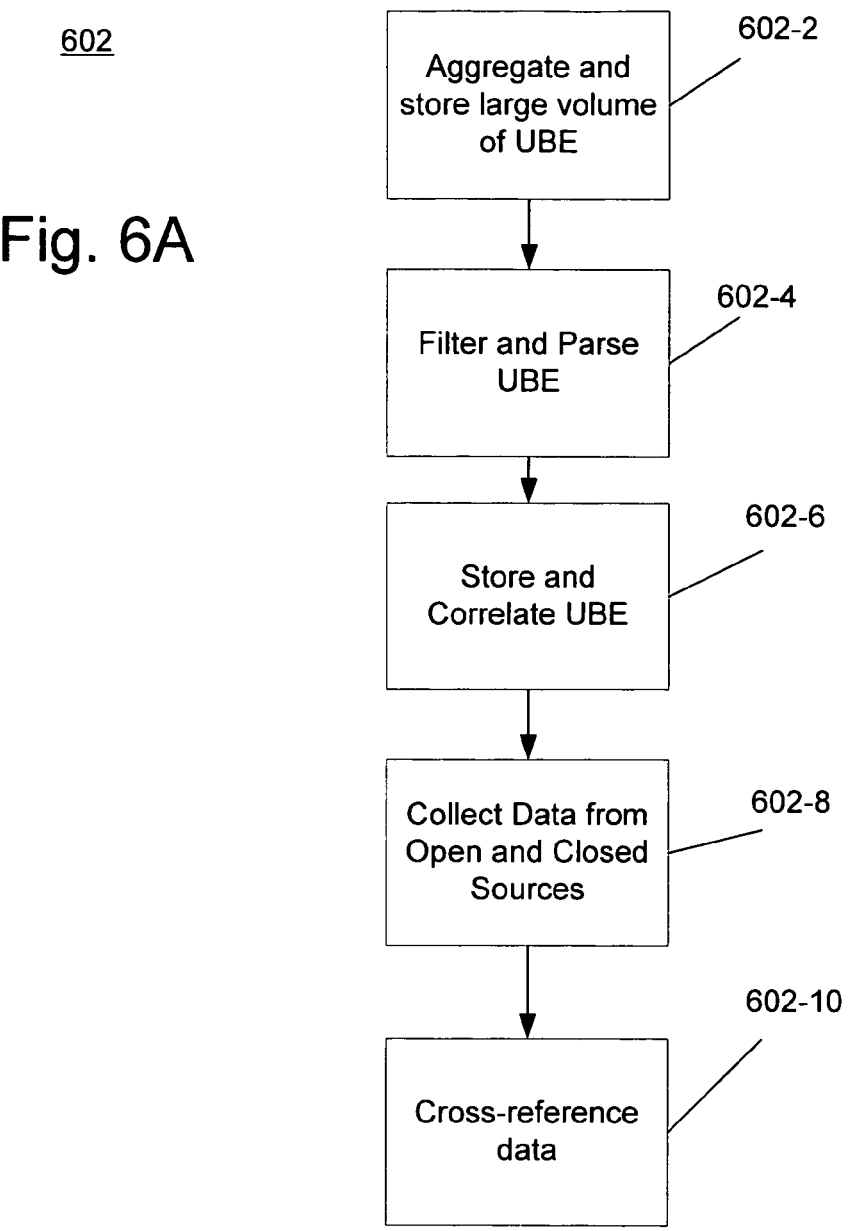

Referring now to FIG. 6A, and again to FIG. 1 as an illustrative example of a system which may implement method 600, step 602 of FIG. 6 is explained in further detail. At step 602-2 server 112 aggregates UBEs and ensures that UBEs are securely stored in repository 126. At step 602-4, filtering and parsing engine 128 extracts data from each UBE which is relevant to: the threat type, the UBE source or sender, intermediary ISPs involved, the victim ISP or user receiving the UBE, and beneficiary of the UBE—the party whose product/service is advertised or otherwise benefits from the threat activity. At step 602-6, the parsed data is stored in knowledge database 130 and correlated so that UBEs are linked and grouped according to shared threat type, source, victim, intermediary or beneficiary.

At step 602-8 data is collected from various open and closed intelligence sources regarding either threat activity sources/beneficiaries that are already known or detected for the first time in the parsing at step 602-6. For example, information from an existing litigation could be used here. The sources include, for example, Domain WHOIS records, IP address WHOIS records, confidential informants, cooperating witnesses, secretary of state records, court records, and other knowledge bases. In step 602-10, both server 112 and human operators using server 112 may cross-reference the groupings of UBEs performed at step 602-6 with the list of threat sources and beneficiaries from step 602-8. As such, evidence of a UBE is associated with parties thought to be associated with Internet threat activities. Such cross-referencing includes email domain searching for trademark or terms of use violations combined with a search of the body of an email for certain URLs or the header of an email for certain IP ranges; searching the email body for certain combinations of text indicative of phishing, fraud, or other actionable content; or searching for specific URLs in the body of an email and the same term in the email domain. Among other aspects of the invention, accommodating the association of evidence with potential targets and thereby making the targets actionable is neither known nor suggested in the prior art.

Figure 6B:
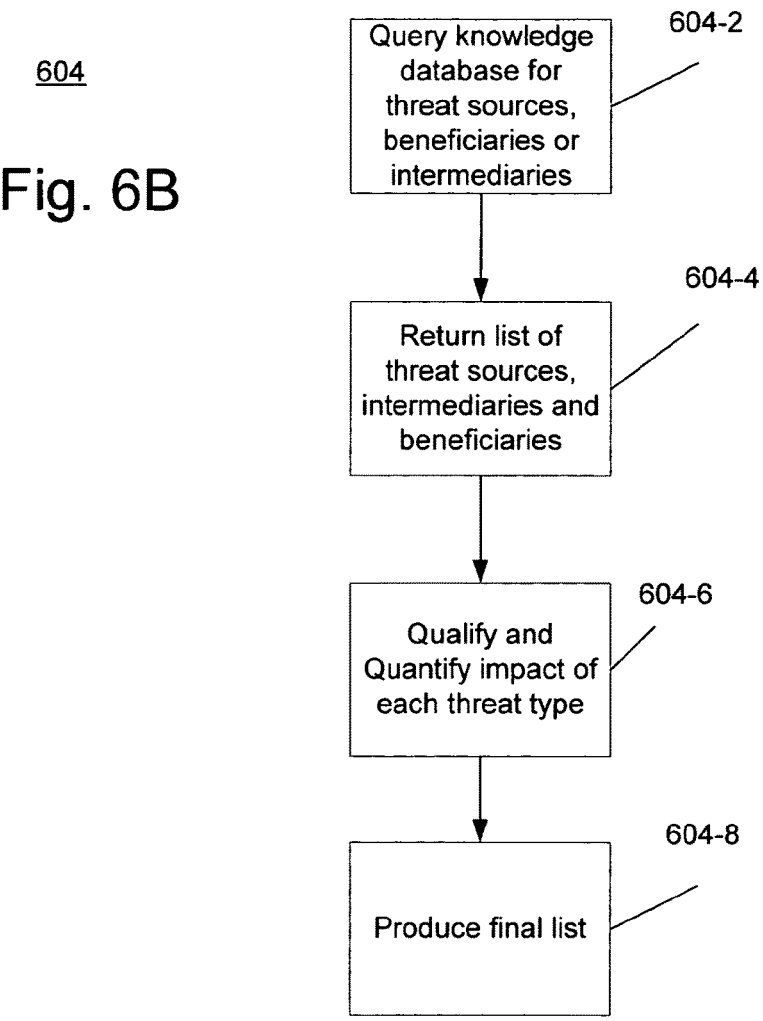

Referring now to FIG. 6B, and also, for example, FIG. 1, step 604 of FIG. 6 is explained in further detail where evidence is prioritized. At step 604-2, queries are issued against knowledge database 130 (FIG. 1), for example, by users of system 100 or by automated processes for threat sources, beneficiaries, or intermediaries. These queries determine which threat sources, beneficiaries, or intermediates have been responsible for the range of activity types which pose a negative impact on a victim. At step 604-4 the queries return a list of threat sources, intermediates and beneficiaries and demonstrate the type of threats originating from, through or in relation to the parties and the volume of each type of threat. At step 604-6, each threat type is qualified and quantified. For example, a dollar loss value per instance may be calculated. Additionally, costs such as shielding a customer from SPAM, loss of productivity, and the cost to deal with SPAM may be considered. At step 604-8, a final list is produced of threat sources, intermediaries and beneficiaries prioritized by volume and severity of related threats. Among other aspects of the invention, gathering a large volume of evidence and intelligence in an automated way and thereby providing a more reliable means of assessing a threat, is neither known nor suggested in the prior art.

Figure 6C:
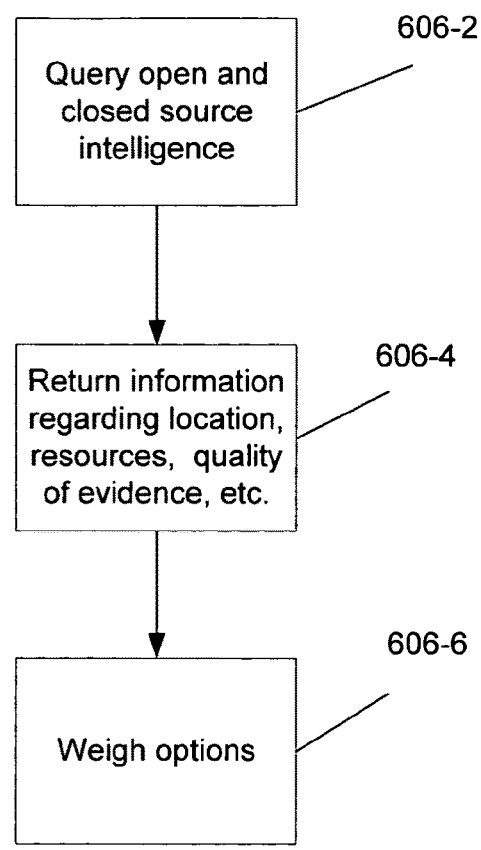

Referring now to FIG. 6C, and also, for example, FIG. 1, step 606 of FIG. 6 is explained in further detail where a threat is assessed. At step 606-2, queries are issued against open and closed source intelligence as discussed above regarding the threat activity, source, beneficiary and intermediary which may be stored in knowledge database 130 (FIG. 1). At step 606-4, the queries from step 606-2 return information such as the location of the party, his resources, the nature of the threat activity, the qualities of evidence available in evidence repository 126, and the manner in which such evidence was collected. At step 606-4, using the information from step 606-4, a user weighs the available evidence and determines whether action should proceed against a potential target. Based on the decision made in step 606-6, proprietary email accounts may be seeded differently—as discussed below in FIG. 9.

Figure 7:
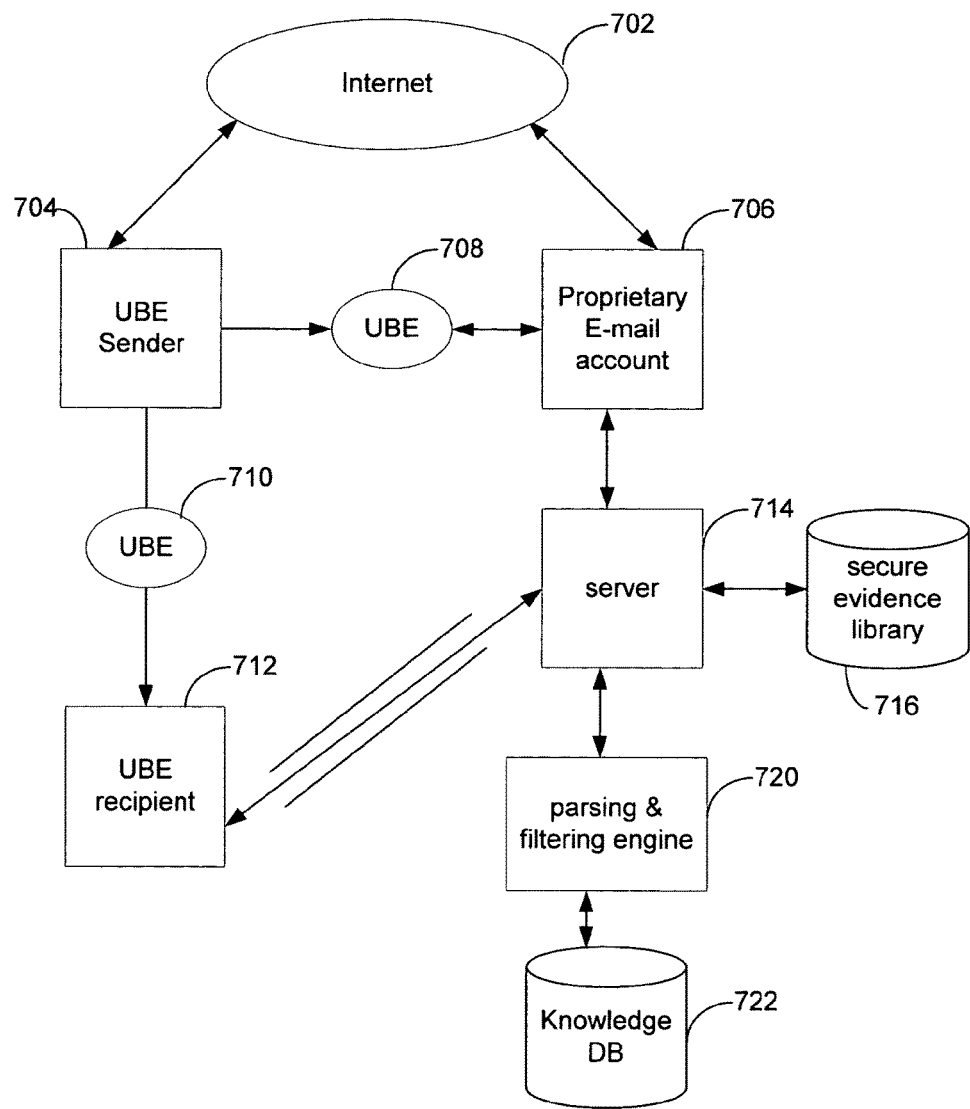
FIG. 7 is a conceptual block diagram of a system according to an embodiment of the invention.

FIG. 7 is a conceptual block diagram of a system 700 for utilizing a proprietary email account, according to an embodiment of the invention. The system 700 includes the Internet 702, an unsolicited e-mail sender 704, a proprietary email account 706, an unsolicited e-mail recipient 712, a server computer 714, a filtering and parsing engine 720, a knowledge database 722, and a secure evidence repository 716. Server computer 714 functions as a mail aggregator as discussed below.

The proprietary email account is an e-mail account or e-mail address used to collect unsolicited e-mails and may be set up by the operator of system 700 or a client of system 700. Proprietary email account 706 is designed such that no solicited e-mails can be received; therefore, any e-mails received by the proprietary email account are unsolicited. Unsolicited e-mails obtained by the proprietary email account 706 can be stored and used to identify senders of unsolicited e-mails to recipients, for evidence in a legal action, and to add to the information stored and available in a knowledge database.

Specifically, as depicted, an unsolicited e-mail sender sends an unsolicited e-mail 710 to recipient 712, and also sends an unsolicited e-mail 708 to proprietary email account 706. Both unsolicited e-mails are forwarded securely to the server computer 714. If account 706 is set up by a client of the operator of system 700, a secure channel may be used to forward the UBEs. Server computer 714 sends copies of the unsolicited e-mails to secure evidence repository 716. Server computer 714 also sends copies to a parsing and filtering engine 720 and, after parsing and filtering, information regarding the e-mails is stored in a knowledge database. Unsolicited e-mails can be sent to the secure evidence repository, parsing and filtering engine 720, or knowledge database 722, without use of server computer 714.

FIG. 8 is a conceptual block diagram of a system 800 for using a proprietary email account including seeding, according to one embodiment of the invention. The system includes the Internet 802, a proprietary email account 804, an unsolicited e-mail sender 806, and a "Do Not Send" list 808. The "Do Not Send" list 808 can be a list indicating the unsolicited e-mails are not to be sent, or cannot legally be sent, to listed accounts. For example, some Web sites have, through legal obligation or otherwise, areas in which individuals can choose to be listed on a "Do Not Send" list.

In spite of intended purpose of "Do Not Send" lists however, some senders of unsolicited e-mails actually harvest accounts or addresses from such lists as targets to be sent unsolicited e-mails. Electronic Internet spiders or crawlers may be used to harvest the accounts from the lists.

As such, including proprietary email accounts in "Do Not Send" lists causes the account to receive unsolicited e-mails, which is the purpose of a proprietary email account. This is depicted in FIG. 8. Specifically, the proprietary email account becomes listed 812 on the "Do Not Send" list 808. An Internet spider 810 sent out by unsolicited e-mail sender 806 obtains and returns to the sender 806 the proprietary email account listing. Sender 806 sends an unsolicited e-mail to the proprietary email account 804. Thereafter, the UBE can be further processed as in FIGS. 1 and 7. A raw copy of the UBE can be obtained by a server computer and sent to a secure evidence repository, and a copy of the UBE can be sent to a parsing and filtering engine. The UBE can be processed in the parsing and filtering engine, and information about the UBE can be stored in a knowledge database. Information in the databases can be used and analyzed as discussed above.

FIG. 9 is a conceptual block diagram of a system 900 for seeding proprietary email accounts, according to one embodiment of the invention. The system includes the Internet 902, an unsolicited e-mail sender 904, a Internet spider program 906, an unsolicited e-mail recipient 922, a server computer 924, a parsing and filtering engine 928, a knowledge database 930, and a proprietary email account network 910. The network 910 includes a web site 912, and three proprietary email accounts 914, 916, 918.

Spider programs may be used by spammers to seek to obtain e-mail accounts associated with an Internet Service Provider (ISP). System 900 is designed to seed the proprietary email accounts so that such spiders harvest these accounts. Specifically, proprietary email account network 910 is designed to appear to a spider (based on the programming of the spider) to be an ISP. A Web page or site 912 is established as well as a number of apparently associated proprietary email accounts 914, 916, 918. Disguised in this way, network 910 induces spider 906 to harvest the proprietary email accounts 914, 916, 918 and return them to the sender 904. This seeding is generally used for proprietary email accounts. As a result, the sender sends an unsolicited e-mail or e-mails to one or more of proprietary email accounts 914, 916, 918 (as depicted, 914). Additionally, sender 904 sends unsolicited e-mails to recipients, such as unsolicited e-mail 920 sent to recipient 922. The unsolicited e-mails received by the proprietary email accounts as well as the recipient 922 are securely sent to server 924, which sends copies to secure evidence repository 926. Server computer 924 also sends copies to a parsing and filtering engine 928 and, after parsing and filtering, information regarding the e-mails is stored in a knowledge database 930.

FIG. 10 is a block diagram of a system 1000 including identification of senders of unsolicited communications such as e-mails, including thieves, according to one embodiment of the invention. The system 1000 takes advantage of the tendency for spammers or thieves to associate and communicate with each other. For example, once a thief is identified, the thief's activities can be monitored to help identify the thief's associates or organizational superiors. This information can then be used, for example, to help facilitate obtaining information and taking legal action against the thief, the thief's associates or superiors, or a company or entity with which a thief is associated.

The system 1000 includes the Internet 1002, an identity thief network 1004 that can be physically separated but communicate or associate via the Internet 1002, a recipient 1012 of an unsolicited e-mail sent by a thief, a bulletin board 1010 used by the thieves to communicate with each other, a server computer 1014, a secure evidence repository 1016, a filtering and parsing engine 1020, and a knowledge database 1022. Server computer 1014 functions as a mail aggregator as discussed below.

As depicted, thief P7 sends an unsolicited e-mail to recipient 1012. The UBE is forwarded to server computer 1014. The server computer 1014 sends copies to secure evidence repository 1016. Server computer 1014 also sends copies to a parsing and filtering engine 1020 and, after parsing and filtering, information regarding the e-mails is stored in a knowledge database 1022.

At monitoring and analysis section 1018, analysis which can include link analysis, is performed on information from knowledge database 1022, such as by a server threat management program, to determine the identity of, and other information associated with, the thief P7. Monitoring and analysis can be computerized, human, or both. The thief P7, however, may be only a "small fish." For example, the thief may be low in a hierarchy associated with a black market drug company and unsolicited e-mail may be an attempt to fraudulently sell drugs, including lies about the company or the drugs, or both.

From the information obtained about the thief P7, which can include, for example, tracking or investigating Web sites or pages that have been visited by an e-mail address of the thief, it is learned that P7 uses an electronic Internet-based bulletin board 1010 to post and receive messages from his associate thieves. An account, such as an automated account that appears to be associated with a real person but is actually automatically set up or monitored, can be created and maintained, and messages left, with bulletin board 1010. Using the account, copies of information from the bulletin board, including messages, can be monitored and, for example, periodically stored to provide evidence of the communications on the board 1010.

Communications on bulletin board 1010, which can be from or to the thief P7, can indicate, evidence, or inculpate associates of the thief P7 who may also use board 1010. The communications can also include admissions that can have evidentiary value.

From communications using board 1010, it is learned that P1 is identified 1008 as the leader of P7's organization, a black market drug company. From this and other information, a legal action, including a criminal or civil action can be facilitated by recipient 1012, or other recipients or harmed persons, against one or several of the thieves, or the black market drug company or organization itself. Information stored in secure evidence repository 1016 can be used to bring or support such action.

FIG. 11 is a flow diagram of a method 1100 for identifying sources of UBEs according to one embodiment of the invention. At step 1102, a source is identified, such as by methods according to the invention.

At step 1104, the source's Internet-based activities are monitored. At step 1106, obtained information relating to the monitored Internet activity is stored in a database. At step 1108, the stored information is used in identifying other entities.

Thus, the invention provides new systems and methods for enabling a company to take action against threat sources. Evidence regarding infringing mail activity is automatically acquired though the use of proprietary accounts, client accounts, and referrals of emails by victims. Evidence is automatically preserved in a secure evidence repository. The evidence is parsed to extract data relating to threat types, sources, intermediate parties, and beneficiaries. Activity evidence is associated with common threat types, sources, intermediaries, and beneficiaries. Tools are available for cross-referencing the activity information with open and closed source intelligence. Querying and reporting tools are provided to determine which threats produce the most impact and which are actionable.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method generate a report, the method comprising:
parsing, by a processor, a first unsolicited electronic communication into one or more first fields of the first unsolicited electronic communication;
identifying, by the processor, particular information included in the one or more first fields of the first unsolicited electronic communication, to produce first parsed data;
parsing, by the processor, a second unsolicited electronic communication into one or more second fields of the second unsolicited electronic communication;
identifying, by the processor, particular information included in the one or more second fields of the second unsolicited electronic communication, to produce second parsed data;
storing the first parsed data in a memory;
storing the second parsed data in the memory;
correlating, by the processor, the first and second parsed data by identifying a match between the particular information of the first parsed data and the particular information of the second parsed data, to form a correlation between the first and second parsed data;
generating, by the processor, an association between an entity with the first and second unsolicited electronic communications based on the correlation between the first and the second parsed data; and
generating the report based on the association.

2. The method of claim 1, wherein generating the association between the entity with the first and second unsolicited electronic communications is further based on:
obtaining, by the processor, third parsed data from publicly available open sources and privately available closed sources, wherein the third parsed data relates to the matched particular information of the first and second electronic communications.

3. The method of claim 2, wherein the open sources include Domain WHOIS records, IP address WHOIS records, secretary of state records, and/or court records.

4. The method of claim 1, wherein the particular information includes a threat type, or sources of, the first and the second unsolicited electronic communications.

5. The method of claim 1, wherein the particular information includes identification of intermediary internet service providers involved with sending the first and the second unsolicited electronic communications.

6. The method of claim 1, wherein the particular information includes a recipient of the first and the second unsolicited electronic communications, an internet service provider involved with sending the first and/or second unsolicited electronic communications, and/or a beneficiary of the first and the second unsolicited electronic communications.

7. The method of claim 1, further comprising:
filtering, by the processor, the first and second parsed unsolicited electronic communications to remove portions of the first and second parsed unsolicited electronic communications to produce first and second filtered electronic communications; and
wherein the correlating is performed on the first and second filtered electronic communications.

8. The method of claim 1, further comprising:
determining, by the processor, that the first unsolicited electronic communication includes an HTML file reference or HREF that causes a mail browser to download a file;
time-stamping, by the processor, a copy of an image associated with the HTML file reference or HREF; and
storing the time-stamped copy in the memory.

9. The method of claim 8, further comprising:
obtaining, by the processor, additional information from publicly available open sources and privately available closed sources, wherein the additional information is related to one or more web sites that are related to the HTML file reference and/or the HREF.

10. A method to generate a report, the method comprising:
parsing, by a processor, an unsolicited electronic communication into one or more fields of the unsolicited electronic communication;
identifying, by the processor, first information included in the unsolicited electronic communication to produce a parsed electronic communication;
cross referencing, by the processor, the parsed electronic communication with second information stored in a database by identifying matches between the first information and the second information to produce cross-referenced information, wherein the second information is related to a sender of unsolicited bulk emails;
storing the cross-referenced information in a memory;
querying, by the processor, the memory with terms associated with an entity;
generating an association between the unsolicited electronic communication with the entity based on the results of the query; and
generating the report based on the association.

11. The method of claim 10, further comprising:
determining, by the processor, a monetary loss value associated with the unsolicited electronic communication; and
prioritizing, by the processor, the entity over other entities based on the monetary loss value.

12. The method of claim 10, wherein the second information further includes data from open sources, wherein the open sources include Domain WHOIS records, IP address WHOIS records, secretary of state records, and/or court records.

13. The method of claim 10, wherein the first information includes a threat type, or sources of, the unsolicited electronic communication.

14. The method of claim 10, wherein the first information includes identification of an intermediary internet service provider involved with sending the unsolicited electronic communication.

15. The method of claim 10, wherein the first information includes identification of a recipient of the unsolicited electronic communication, an internet service provider involved with sending the unsolicited electronic communication, and/or a beneficiary of the unsolicited electronic communication.

16. The method of claim 10, further comprising filtering, by the processor, the parsed electronic communication to remove portions of the parsed electronic communication to produce a filtered electronic communication.

17. The method of claim 10, further comprising:
determining, by the processor, that the unsolicited electronic communication includes an HTML file reference or HREF that causes a mail browser to download a file;
time-stamping, by the processor, a copy of an image associated with the HTML file reference or HREF; and
storing the time-stamped copy in the memory.

18. The method of claim 17, further comprising:
obtaining, by the processor, additional information from publicly available open sources and privately available closed sources, wherein the additional information is related to one or more web sites that are related to the HTML file reference and/or the HREF.

19. A computing device, comprising:
one or more processors; and
a memory effective to be in communication with the one or more processors;
the one or more processors effective to:
receive a first and a second unsolicited electronic communication;
parse the first unsolicited electronic communication into one or more first fields of the first unsolicited electronic communication;
identify particular information included in the first unsolicited electronic communication, to produce a first parsed electronic communication;
parse the second unsolicited electronic communication into one or more second fields of the second unsolicited electronic communication;
identify particular information included in the second unsolicited electronic communication, to produce a second parsed electronic communication;
store the first parsed electronic communication in the memory;
store the second parsed electronic communication in the memory;
correlate the first and second parsed electronic communications through identification of a match between the particular information of the first and second parsed electronic communications, to form a correlation between the first and second parsed electronic communications;
generate an association between the first and second unsolicited electronic communications with an entity based on the correlation between the first and the second parsed electronic communications; and
generate a report based on the association.

20. The computing device of claim 19, wherein the processor is further effective to:
determine that the unsolicited electronic communication includes an HTML file reference or HREF that causes a mail browser to download a file;
time-stamp a copy of an image associated with the HTML file reference or HREF; and
store the time-stamped copy in the memory.

* * * * *